(12) United States Patent
Ekström et al.

(10) Patent No.: US 12,743,088 B2
(45) Date of Patent: Sep. 22, 2026

(54) METHODS AND SYSTEMS FOR REMOTELY ASSISTING PARKING OR UNPARKING A VEHICLE

(71) Applicant: Volvo Car Corporation, Gothenburg (SE)

(72) Inventors: Maria Ekström, Gothenburg (SE); Martin Bonander, Gothenburg (SE); Jonas Oresten, Gothenburg (SE); Emil Åstrand, Gothenburg (SE); David Jaller, Gothenburg (SE); Andreas Lindberg, Gothenburg (SE); Anders Cullbrand, Gothenburg (SE); Oskar Rödholm, Gothenburg (SE); Patrik Wallengrip, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 21 days.

(21) Appl. No.: 18/923,750

(22) Filed: Oct. 23, 2024

(65) Prior Publication Data

US 2025/0138543 A1 May 1, 2025

(30) Foreign Application Priority Data

Oct. 25, 2023 (EP) .................................... 23205897

(51) Int. Cl.

*G05D 1/223* (2024.01)
*G05D 109/10* (2024.01)
*G06F 3/0486* (2013.01)
*G06F 3/0488* (2022.01)

(52) U.S. Cl.

CPC ......... *G05D 1/2232* (2024.01); *G06F 3/0486* (2013.01); *G06F 3/0488* (2013.01); *G05D 2109/10* (2024.01)

(58) Field of Classification Search

CPC .. G05D 1/2232; G05D 2109/10; G05D 1/223; G06F 3/0486

USPC .............................................................. 701/2

See application file for complete search history.

(56) References Cited

U.S. PATENT DOCUMENTS 11,067,978 B2 * 7/2021 Nagashima ......... G06F 3/04847
2020/0041992 A1 * 2/2020 Nagashima ......... G06F 3/04847
2020/0133259 A1 * 4/2020 Van Wiemeersch ......................... G05D 1/0022
2021/0216202 A1 * 7/2021 Noguchi ................ B60K 35/29
(Continued)

FOREIGN PATENT DOCUMENTS

DE 102020113382 A1 11/2021

*Primary Examiner* — Yazan A Soofi
(74) *Attorney, Agent, or Firm* — Ipsilon USA—NLO

(57) ABSTRACT

A method for a vehicle system to assist to remotely parking or unparking a vehicle, the method comprising transmitting, to a remote device, a challenge request, determining, by the vehicle system, whether a challenge response to the challenge request has been received from the remote device, wherein the challenge response comprises information about a touch position on a touch screen of the remote device wherein a touch input has been received, if the challenge response is received, determining, by the vehicle system, whether the challenge response is valid, if the challenge response is valid, controlling the vehicle to move, and if the challenge response is not valid, controlling the vehicle to brake, wherein the challenge response is valid if the touch position indicates that the touch input is an expected rub movement performed on a valid area of the touch screen.

12 Claims, 5 Drawing Sheets

(56) References Cited

U.S. PATENT DOCUMENTS

2021/0269092 A1 9/2021 Golgiti et al.
2021/0369092 A1* 12/2021 Arai .................. A61B 1/00149
2022/0229432 A1* 7/2022 Van Wiemeersch ..... B62D 1/00
2023/0159019 A1* 5/2023 Golgiri ................ G05D 1/0016
701/2

* cited by examiner

METHODS AND SYSTEMS FOR REMOTELY ASSISTING PARKING OR UNPARKING A VEHICLE

TECHNICAL FIELD

The current disclosure relates to a method for a vehicle system to assist to remotely parking or unparking a vehicle. The disclosure also relates to a remote device and a vehicle system to assist to remotely parking or unparking a vehicle.

BACKGROUND ART

Newer vehicles have sensors attached providing a 360 degree view of the area surrounding the vehicle. The processed information from these sensors can be used to localize nearby objects such as parked cars or vulnerable road users such as humans walking in parking lots. This, together with the possibility to connect a remote device to the vehicle and securely locate the remote device in reference to the vehicle enables a user to remotely park the vehicle. This may be useful, for instance, when access to the driver's door is not possible or obstructed.

Dead man's switch (DMS) solutions can be used to remotely control a vehicle. They are usually implemented as a challenge-response sequence in which the vehicle sends challenges with an identification to a remote device and the remote device should provide a response to the challenge via a phone application depending on the user actions, within a predetermined time. The DMS will give enable that the vehicle can give propulsion when engaged and immediately brake once released.

As this is the only means for the driver to safely stop the car, the challenge should be complicated enough to avoid unintentional responses. At the same time, the challenge should be simple enough to allow the user to focus on the movement of the vehicle while providing the response.

A known DMS solution for this problem consists of a button provided in an area of a touch screen of the remote device that the driver needs to push and hold in order to give propulsion to the vehicle. The vehicle immediately brakes when the button is released, the user is pushing outside the button area, or the distance between the remote device and the vehicle is outside of the designated operation distance. This is the most user friendly solution as the DMS is very simple and the driver can focus on the surroundings instead of needing to focus too much attention on the screen.

The vehicle would in this case accept any response containing x- and y-coordinates that are inside the button displayed on the screen. Once the remote device responds with no coordinates (not pressed) or coordinates outside the area of the button, the vehicle will brake. However, this solution is prompted to fail in some situations. For instance, users tend to freeze in a dangerous situation and may hold the finger on the screen instead of releasing it.

SUMMARY

The methods and systems of the current disclosure allow a user located outside a vehicle but within an activation distance to move the vehicle in any direction by using a remote device (such as a phone or any other mobile device) that interacts with a vehicle system in the vehicle using a Dead Man's Switch (DMS) functionality. In this way, the remote device will respond to a unique challenge from the vehicle system and the vehicle system will validate the response if the response complies with what the vehicle system anticipates. The vehicle system will control the vehicle to brake if the interaction is interrupted or the response is not validated. This is known as a challenge-response authentication wherein, in an initialization step, a random code may be sent out from the vehicle system together with the coordinates to lay out the user interface in the touch screen of the remote device. The remote device will output in the touch screen what the vehicle system requests without having knowledge of the purpose of the request and a user will just follow the instructions on the screen, perform certain inputs on the remote device, and send touch screen positions or other information about the performed inputs. The vehicle system will validate the received information.

According to a first aspect, the present disclosure relates to a method for a vehicle system to assist to remotely parking or unparking a vehicle, the method comprising transmitting, to a remote device, first data for triggering a challenge response, receiving, as a challenge response from the remote device, second data, wherein the second data comprises information about a touch position on a touch screen of the remote device, determining whether the challenge response is valid, if the challenge response is valid, controlling the vehicle to move, and if the challenge response is not valid, controlling the vehicle to brake, wherein the challenge response is valid if the touch position is different than a previous touch position corresponding to a previously received second data, and if the touch position is within a first threshold distance from the previous touch position. This is an efficient and simple way of validating a user's input wherein the remote device only needs to send touch coordinates to the vehicle system. Also this kind of rub movement wherein a user presses with a finger on a position of the touch screen and slightly moves the finger around said position is simple enough to allow a user to pay attention to the surroundings but will cause that in a dangerous situation, even if the user freezes, the vehicle will stop.

According to a second aspect, the present disclosure relates to a method for a vehicle system to assist to remotely parking or unparking a vehicle, the method comprising transmitting, to a remote device, first data for triggering a challenge response, receiving, as the challenge response from the remote device, second data wherein the second data comprises information about a touch position on a touch screen of the remote device, determining whether the challenge response is valid, if the challenge response is valid, controlling the vehicle to move; and if the challenge response is not valid, controlling the vehicle to brake, wherein the challenge response is valid if the touch position corresponds to an expected swipe movement, wherein the expected swipe movement comprises pressing down on a first zone among a plurality of contiguous zones, continuously moving a finger into subsequent zones and continuously moving the finger back after reaching a final zone among the contiguous zones. A continuous movement of the finger in one direction and back through a plurality of contiguous zones is simple enough to allow a user to pay attention to the surroundings but will cause that in a dangerous situation, even if the user freezes, the vehicle will stop. This allows for different swiping speeds and for skipping sometimes some zones to adapt to different users that may swipe in different ways. The plurality of contiguous zones is not something that is shown on the touch screen of the remote device but it is an agreement between the remote device and the vehicle system to allow the vehicle system to validate the challenge responses from the remote device. In this way, during an initialization phase, the remote device and the vehicle system may interchange information to agree a coordinate system for the touch inputs and the position of the valid area. Then the vehicle system can check whether the swipe movement is correctly performed by the user by considering a part of the touch screen divided in contiguous zones and verifying that the swipe input moves through the zones in certain way.

The expected swipe movement may be called a first swipe movement.

The expected swipe movement may further comprise continuously moving a finger from one contiguous zone to the next within an expected amount of time that is less than a first time threshold and more than a second time threshold.

The expected swipe movement may further comprise skipping one or two zones. For instance, the user may sometimes change direction before reaching the final zone, thereby skipping one or two zones.

According to a third aspect, the present disclosure relates to a method for a vehicle system to assist to remotely parking or unparking a vehicle, the method comprising transmitting, to a remote device, first data for triggering a challenge response, receiving, as the challenge response, from the remote device, second data, wherein the second data comprises a first information about a touch position on a touch screen of the remote device and a second information indicating a position of the remote device in relation to ground, determining whether the challenge response is valid, if the challenge response is valid, controlling the vehicle to move; and if the challenge response is not valid, controlling the vehicle to brake, wherein the challenge response is valid if the touch position is within a certain range from a previous touch position corresponding to a previously received second data, if the second information indicates that the position of the remote device is different than a previous position indicated by previously received second information, and if the second information range indicates that the remote device forms an angle with the ground within a tilt range. This allows that, during operation the user keeps the remote device within the tilting range and only presses the button, such that he or she can focus on the environment. The second information indicating the position of the remote device with respect to the ground, which may be provided by a gravity sensor of the remote device, will fluctuate even when the user is not actively doing a tilting movement. The fluctuations are used such that the second information sent as a challenge response is not the same as the previous one. In this way, the second information is used by the vehicle system to verify that each challenge response is new. The vehicle will brake if the finger is removed from the touch screen or if the remote device is outside the tilt range. In this way, if an error appears and the vehicle does not brake when the finger is removed, the user can still brake by moving the remote device outside of the tilt range.

The tilt range may be between zero degrees and 90 degrees. However, the tilt range may be any other suitable one. The touch position may comprise data of horizontal and vertical coordinates wherein the user input has been received in the touch screen. This is an efficient way of identifying the touch positions and allows remote device and vehicle system to easily agree on the valid area. This coordinate system agreed between vehicle system and remote device allows that the vehicle system can request the remote device to output specific instructions on the touch screen such that the remote device can execute without having any knowledge about the purpose of the request. In an initialization phase of the parking manuever, this concept can be used to verify whether the user intention is to actually use the parking system. This can be verified by, for instance, requesting the user to push a number of buttons in the right order by touching the expected coordinates on the touch screen. This verification of the user intention does not have to be performed in the vicinity of the car but can also be performed from a distance.

The vertical and horizontal coordinates may comprise respectively a percentage of a width and height of the touch screen.

The step of controlling the vehicle to move may comprise controlling the vehicle to move in any direction such as backwards, forwards, right or left.

The method may further comprise controlling the vehicle to brake if the remote device is not within a certain distance from the vehicle. This ensures that the user can see the vehicle when in movement.

Furthermore, the method may also comprise controlling the vehicle to brake if the challenge response is not received within a certain time from the transmission of the first data The challenge response may be considered as valid if the touch position is performed on a predetermined area of the touch screen.

The present disclosure also relates to a vehicle system comprising a memory, a processing unit and a communication unit wherein the processing unit is configured to perform any of the above method steps.

The present disclosure relates as well to a method for a remote device comprising receiving first data from a vehicle system, receiving a touch input in a position of a touch screen of the remote device in the form of a rub movement; and sending to the vehicle system second data in response to the first data; wherein the second data comprises information about the position of the touch input. This is an efficient and simple way of validating a user's input wherein the remote device only needs to send touch coordinates to the vehicle system. Also this kind of rub movement wherein a user presses with a finger on a position of the touch screen and slightly moves the finger around said position is simple enough to allow a user to pay attention to the surroundings but will cause that in a dangerous situation, even if the user freezes, the vehicle will stop.

In another aspect, the present disclosure relates to a method for a remote device comprising receiving first data from a vehicle system, receiving, from a user of the remote device, a touch input on a position of a touch screen of the remote device while keeping the remote device in a position such that the remote device forms an angle with the ground within a tilt range; and, sending, by the remote device to the vehicle system, second data comprising a first information about a touch position of the touch input and a second information indicating the angle formed by the remote device with the ground. This allows that, during operation the user keeps the remote device within the tilting range and only presses the button, such that he or she can focus on the environment. The second information indicating the position of the remote device with respect to the ground, which may be provided by a gravity sensor of the remote device, will fluctuate even when the user is not actively doing a tilting movement. The fluctuations are used such that the second information sent as a challenge response is not the same as the previous one. In this way, the second information is used by the vehicle system to verify that each challenge response is new. The vehicle will brake if the finger is removed from the touch screen or if the remote device is outside the tilt range. In this way, if an error appears and the vehicle does not brake when the finger is removed, the user can still brake by moving the remote device outside of the tilt range.

Furthermore, the present disclosure relates to a method for a remote device comprising receiving first data from a vehicle system, receiving a touch input performed by a user of the remote device in the form of a swipe movement on the touch screen, wherein the swipe movement comprises the user pressing down on a first zone among a plurality of contiguous zones with a finger, continuously moving the finger into subsequent zones and continuously moving the finger back after reaching a final zone among the plurality of contiguous zone and sending to the vehicle system second data comprising information about a touch position on a touch screen of the remote device wherein the touch input has been received. A continuous movement of the finger in one direction and back through a plurality of contiguous zones is simple enough to allow a user to pay attention to the surroundings but will cause that in a dangerous situation, even if the user freezes, the vehicle will stop. This allows for different swiping speeds and for skipping sometimes some zones to adapt to different users that may swipe in different ways. The plurality of contiguous zones is not something that is shown on the touch screen of the remote device but it is an agreement between the remote device and the vehicle system to allow the vehicle system to validate the challenge responses from the remote device. In this way, during an initialization phase, the remote device and the vehicle system may interchange information to agree a coordinate system for the touch inputs and the position of the valid area. Then the vehicle system can check whether the swipe movement is correctly performed by the user by considering a part of the touch screen divided in contiguous zones and verifying that the swipe input moves through the zones in certain way.

The present disclosure also relates to a remote device configured to perform said methods.

BRIEF DESCRIPTION OF DRAWINGS

FIG. 8 illustrates a further embodiment, showing a remote device in a position forming an angle with the ground and an acceptable angle range.

FIG. 9 illustrates further embodiments of drag and hold initial gestures.

FIG. 10 illustrates a further embodiment of an initial gesture with various drag distance possibilities.

FIG. 11 shows an example of a horizontally oriented drag area.

FIG. 12 shows an example of a vertically oriented drag area.

DESCRIPTION OF EMBODIMENTS

The following is a description of certain embodiments of the present disclosure, given by way of example only and with reference to the figures.

Figure 1A:
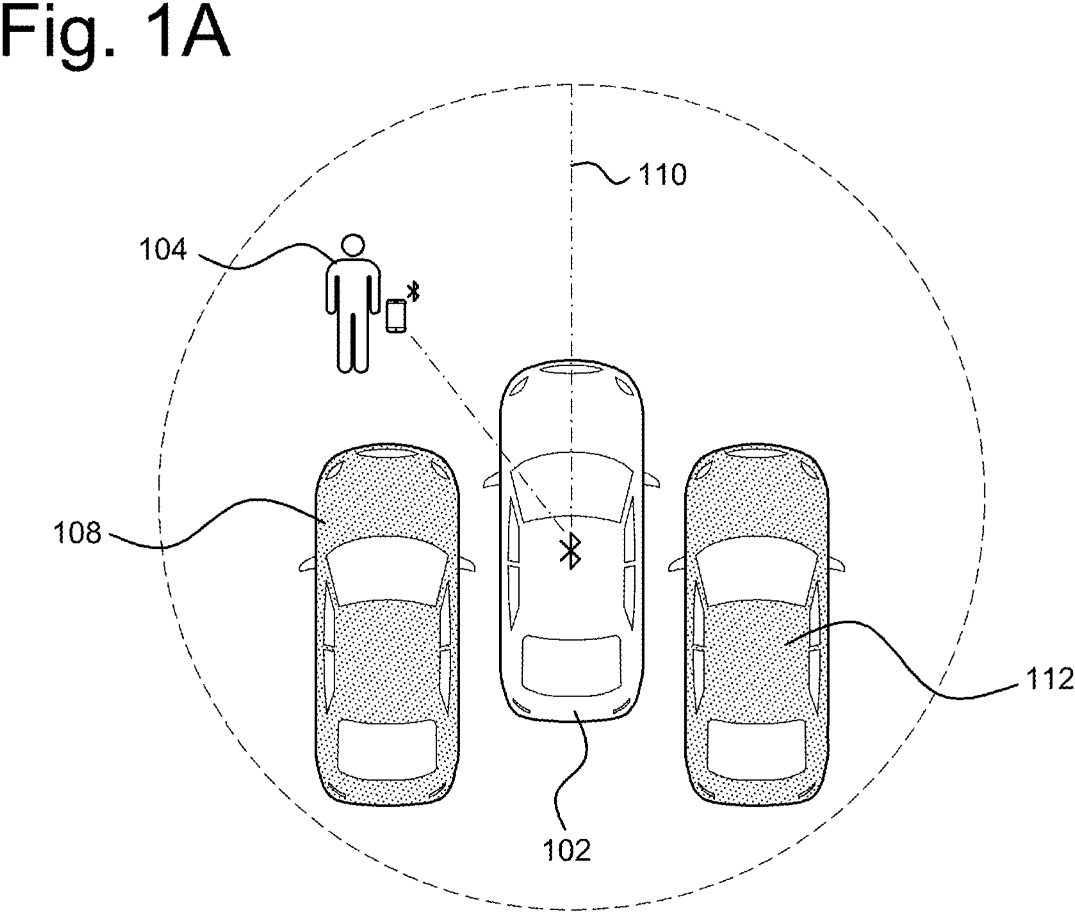
FIG. 1A illustrates a user with a remote device remotely parking or unparking a vehicle according to the present disclosure.
Figure 2:
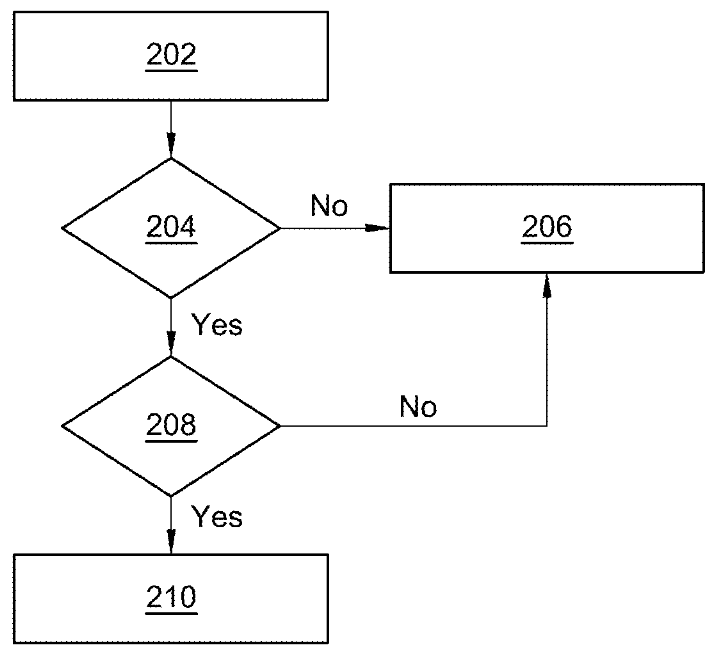
FIG. 2 illustrates a flowchart schematically depicting a process for a vehicle system of a vehicle for remotely parking or unparking the vehicle according to the present disclosure.
Figure 3:
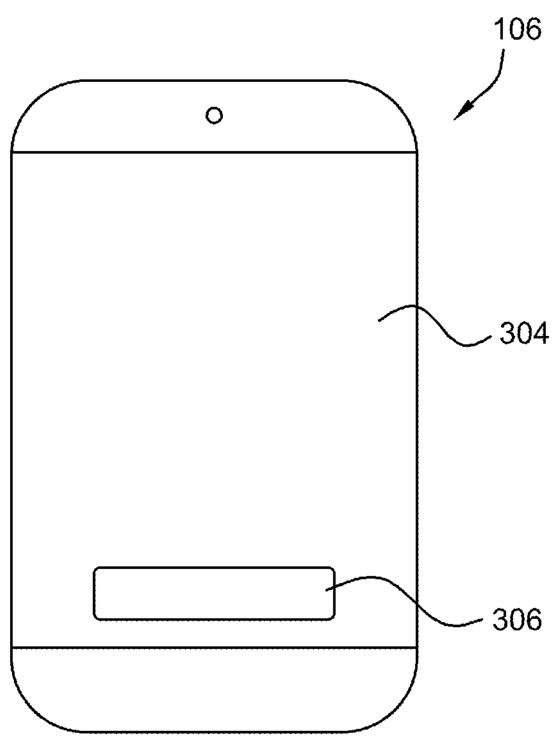
FIG. 3 shows a remote device with a touch screen comprising a valid area.

FIG. 1A illustrates a user with a remote device remotely parking or unparking a vehicle and FIG. 2 shows a flowchart schematically depicting a process for a vehicle system in a vehicle for remotely parking or unparking the vehicle according to the present disclosure. FIG. 3 shows an example of the remote device of FIG. 1A with a touch screen comprising a valid area for remotely parking or unparking the vehicle.

Figure 1B:
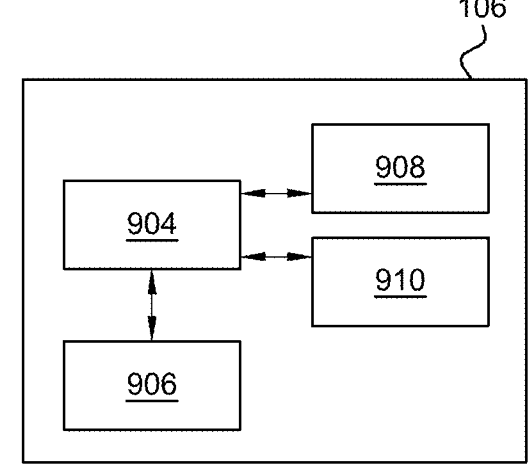
FIG. 1B shows a block diagram of a remote device according to the present disclosure.
Figure 1C:
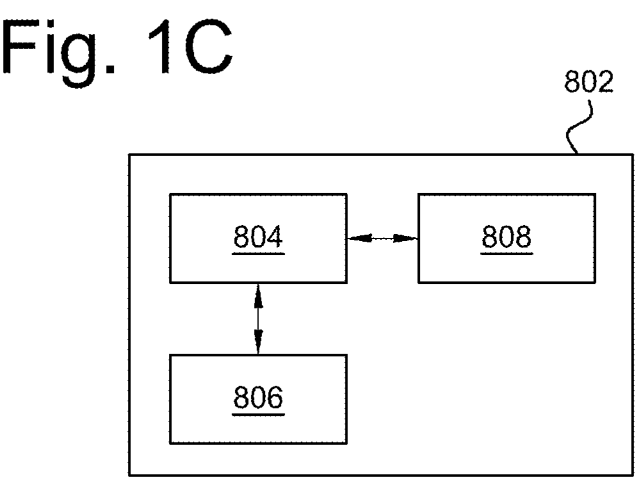
FIG. 1C shows a block diagram of a vehicle system according to the present disclosure.

FIG. 1A shows a user 104 holding a remote device 106 used to remotely assisting parking and unparking a vehicle 102. FIG. 1B shows a block diagram of the remote device 106. The remote device 106 may comprise a processing unit 902, a memory 904, a communication system 906 and a touch screen interface 908. The processing unit 902 is connected to the touch screen interface 908, to the memory 904 and to the communication unit 906. The communication system 906 may transmit and receive information via Bluetooth. The communication system 906 may as well transmit and receive information through a wireless communication network, for example, a 4G network. However, the communication system 906 may transmit and receive information using any other suitable communication technology. The remote device 106 is arranged to performed the method of FIG. 7. The vehicle 102 may comprise a vehicle system 802 as shown in FIG. 1B. The vehicle system 802 may comprise a processing unit 804, a memory 808 connected to the processing unit 804 and a communication system 806 connected to the processing unit 804 and configured to transmit and receive information. The communication system 806 may transmit and receive information via Bluetooth. The communication system 806 may also transmit and receive information through a wireless communication network, for example, a 4G network, and/or using any other suitable communication technology. The vehicle system 802 is arranged to perform the method of FIG. 2.

The parking space from or to which the user 104 intends to park or unpark the vehicle 102 is between vehicles 108 and 112 such that access to the lateral doors of vehicle 102 is limited or blocked. In step 202 of FIG. 2, the vehicle system 802 sends, to the remote device 106, first data for triggering a challenge response that needs to be responded to within a certain amount of time given by a first time threshold.

In step 204 of FIG. 2, the vehicle system 802 determines whether second data, as a challenge response, has been received from the remote device 106 within the first time threshold. If no challenge response has been received or if it has been received after the first time threshold has expired, the process proceeds to step 206 and the vehicle system 802 controls the vehicle 102 to brake. Otherwise, the process proceeds to step 208 wherein the vehicle system 802 determines whether the challenge response is valid. The validation of the challenge response will be explained with more detail for three different embodiments in relation to FIGS. 4, 5, 6A and 6B. If the challenge response is not valid, the process proceeds to step 206 and the vehicle system 802 controls the vehicle 102 to brake. If the challenge response is valid, the process proceeds to step 210 and the vehicle system 802 controls the vehicle 102 to move. The vehicle system 802 may also control the vehicle 102 to brake if the remote device is not located within a certain distance 110 to the vehicle. The certain distance may be 5 meters. This ensures that the user can see the vehicle while performing the DMS operation of FIG. 2. However, any other suitable distance that allows the user to see the vehicle 102 can be used. Ultra-wideband communication may be used to determine whether the vehicle is within the certain distance while Bluetooth communication may be used to communicate with the remote device. However, any other suitable communications technologies may be used.

FIG. 3 shows the remote device 106 comprising the touch screen 304. The touch screen 304 has a height on a vertical direction and a width on a horizontal direction. A specific part of the touch screen 304 is a valid area 306 that has a rectangular shape, though the valid area 306 may have any other suitable shape. The valid area 306 may be shown as a button and may display some kind of text indicating that an input is expected there. FIG. 3 illustrates a coordinate system wherein the challenges requests sent in step 202 by the vehicle system 802 of the vehicle 102 requests the anticipated x- and y-position (vertical and horizontal coordinates x and y) of the finger of the user 104 on the touchscreen 304, in a normalized coordinate system. The remote device 106 will have to respond to the challenge request within a certain time, otherwise the vehicle 102 will brake (if the vehicle was in movement). If the challenge response is not received, the vehicle 102 will also brake. The normalized coordinate system could be set to e.g. percentage of the valid area 306 in width and height so that x=0 represents the far left of the valid area 306, x=100 represents the far right of the valid area 306, y=0 represents the far bottom of the valid area 306 and y=100 represents the far top of the valid area 306. In this way both the remote device 106 and the vehicle system 802 in the vehicle 102 are aware of the same coordinate system and the normalized values of the valid area 306. A requirement stating the position of the valid area 306 in the touch screen 304 may come from the vehicle system 802 so that the valid area 306 size or location cannot be changed unless it is agreed. This is a non-limiting example and other implementations are possible. For instance, the boundary of the valid area 306 can also be defined related to percentages of the remote device touch screen 304, etc. As said, a touch position will comprise data of horizontal and vertical coordinates which are respectively the x and y positions of the finger of the user in the touch screen 304 wherein the user input has been received. The vertical and horizontal coordinates x and y may be respectively percentages of the touch screen width and height. The vertical and horizontal coordinates x and y correspond to the touch position of a finger of a user of the remote device on the touch screen 304. According to a first embodiment, the user 104 performs a continuous rub movement within the valid area 306 of the touch screen 304 and, as a response to the challenge request sent in step 202, the remote device 106 sends the current position of the finger on the touch screen.

The challenge response will comprise information about the touch position on the touch screen 304 of the remote device 106 wherein the touch input corresponding to the rub movement is being received. If, in step 204 of FIG. 2, the challenge response is received on time by the vehicle system 802, and in step 208 the method determines that the challenge response is valid, the vehicle system 802 will control the vehicle 102 to move in step 210. Otherwise, the vehicle system 802 will control the vehicle to brake in step 206. The vehicle system 802 in step 208 may determine that the challenge response corresponds to a rub movement by determining whether the touch position is different than a previous touch position corresponding to a previously received challenge response, and whether the touch position is closer than a certain threshold distance from the previous touch position.

As explained, the remote device 106 sends the first data comprising the current position of the finger as a response to the first data. The vehicle system 802 validates that the coordinates are within the valid area, that the coordinates are not the same as in the previous challenge response and are within a certain threshold distance from last touch input. In this way, by comparing the current response with the previous response the vehicle system 802 can validate the rub movement.

Figure 4:
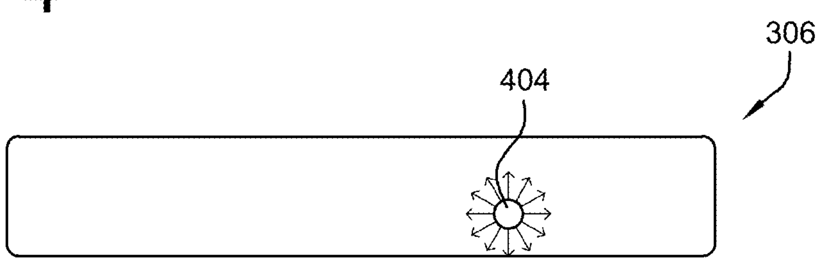
FIG. 4 schematically illustrates a rub movement on a touch screen of a remote device in a first embodiment according to the present disclosure.

The rub movement will be further explained in relation to FIG. 4. FIG. 4 schematically illustrates a rub movement on the valid area 306 of the touch screen of the remote device 106. The rub movement is performed by the user pressing and slightly rubbing back and forth on a valid area 306 of the touchscreen. The motion can be done in any direction and in any part of the valid area 306 of the touchscreen. The vehicle 102 will brake if the user 104 keeps the finger static, releases the finger from the touchscreen 304, moves the finger outside the valid area 306 or does a larger motion than the vehicle system 802 anticipates.

As said, for safety reasons, the change in finger position from one reported position to another may not be larger than a certain threshold distance D from the previous touch position.

This is shown in the below equation:

$$0 < |(x_{i+1}, y_{i+1}) - (x_i, y_i)| < D$$

Wherein x and y represent vertical and horizontal coordinates of the touch screen 304, i+1 denotes the most recent reported position in the touch screen 304 to validate and i denotes the last validated position. Hence, the user 104 has freedom in choosing where to perform the motion with the two restrictions that he or she needs to stay in the valid area 306, needs to keep moving the finger and cannot perform a larger motion than the vehicle anticipates.

As said, FIG. 4 shows an example of a valid area 306 of the touchscreen 304 where the rubbing motion is allowed. In this case it is represented as a button, where the user 104 presses down on the dot 404 and rubs in either direction with some restricted allowed distance.

The vehicle system 802 and the remote device 106 must have a mutual understanding of the valid area 306 of the touchscreen 304 where the rubbing motion is considered an engaged DMS. The remote device 106 will always report the x- and y-coordinates of the motion and the vehicle will only actuate longitudinal and lateral control if the reported coordinates are within the valid area 306 and obeys the above equation. This might be done via a normalized coordinate system, where the rubbing area boundary is recognized as percentages of the screen width and height.

According to a second embodiment, the user 104 may perform a swipe movement on the valid area 306 of the touch screen. The vehicle system will consider that the valid area 306 is divided in a plurality of contiguous zones (zone 1 (511), zone 2 (512), zone 3 (513), zone 4 (514), zone 5 (515) and zone 6 (516) in FIG. 5) and the swipe movement will be valid if it comprises pressing down on a first zone among the contiguous zones, continuously moving a finger into subsequent zones and continuously moving the finger back after reaching a final zone among the contiguous zones. The vehicle system 802 sends first data to the remote device 106 in step 202 of FIG. 2. The remote device sends second data as a challenge response comprising information about a touch position on the touch screen 304 of the remote device 106 wherein a touch input has been received.

If the challenge response is received by the vehicle system 802 in step 204, and it is determined in step 208 that is the expected swipe movement, the vehicle system 802 will control the vehicle to move in step 210. Otherwise, the vehicle system 802 will control the vehicle to brake in step 206, in case the vehicle was already in movement. The vehicle system 802 in step 208 may determine that the challenge response corresponds to the expected swipe movement by comparing the touch position with a previous touch position corresponding to a previously received challenge response. The expected swipe movement may comprise continuously moving a finger from one contiguous zone to the next within an expected amount of time than is less than a first time threshold and more than a second time threshold. The expected swipe movement may comprise skipping one or two zones.

Figure 5:
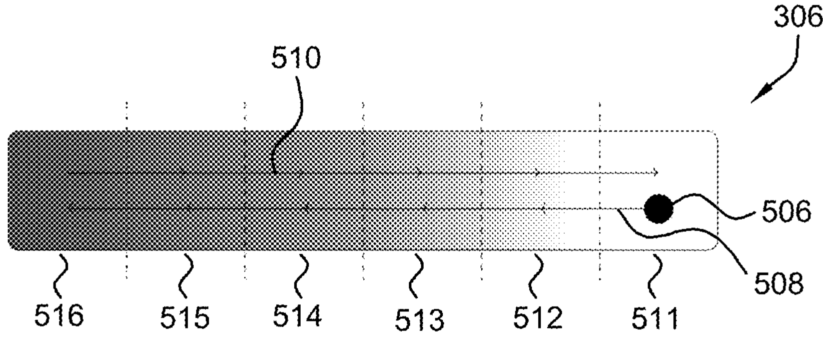
FIG. 5 schematically illustrates a swipe movement on a touch screen of a remote device in a second embodiment according to the present disclosure.

In this way, the DMS is engaged by performing a swiping motion across a valid area 306 of the touchscreen 304 of the remote device 106 from left to right or right to left, depending on the user's choice. The freedom to choose direction only applies when the user starts the motion between the far left and far right area, e.g. between zone 2 (512) and zone 5 (515) as depicted in FIG. 5. When the user has chosen a direction, it needs to be maintained throughout the maneuver and only change direction at the turning points specified by zone 1 (511) and zone 6 (516) as in FIG. 5. Although FIG. 5 shows a swiping direction parallel to one side of the valid area, the swiping movement may be performed in any direction even if no parallel to the side of the valid area. The vehicle brakes if the user releases the finger from the touch screen 304, keeps it still for too long, changes direction of the motion at a point other than the turning points, is outside the valid area 306, or does not perform the anticipated motion correctly, e.g. being slower or faster than the vehicle anticipates.

The vehicle system 802 validates the swiping motion by anticipating that the user moves their finger across the swiping area through a set number of zones, only known to the vehicle system. By putting constraints on how long the user is allowed to stay inside a zone and how many zones the user can skip, the anticipated motion can be validated. In addition, the user may not keep their finger still for too long and the user must continue swiping in the direction that they chose when the DMS was initially engaged. As said, an example of such a swiping area, divided into six zones is depicted in FIG. 5. Some kind of visual indication may be provided to the user to indicate that some zones can be skipped. For instance, in FIG. 5, this is indicated with a gradient indicates that zone 2 (512) and zone 3 (513) can be skipped, but skipping zone 5 (515) or zone 6 (516) would result in movement too fast and the vehicle would brake.

In FIG. 5, the user has pressed down in zone 1 (511) and moved their finger into zone 2 (512), zone 3 (513) and so forth until zone 6 (516) where the user stops and continuously moves their finger back into zone 1 (511). The time it takes for the user to traverse each zone would be the anticipated tempo. It is fine to skip one or two zones, i.e., being a bit faster than what is anticipated, but not more. Conversely, it is fine to be a bit slower than the anticipated tempo, but the user cannot stay in one zone for too long.

According to a third embodiment, the user 104 may keep a touch on the valid area 306 of the touch screen 304 and at the same time keep the remote device 106 in a position such that the remote device 106 forms an angle with the ground within a tilt range. The tilt range may be between zero degrees and 90 degrees. As explained in relation to FIG. 2, in step 202 the vehicle system 802 will send first data to the remote device 106. In step 204, the vehicle system will check whether second data as a challenge response from the remote device has been received within a predetermined time from the transmission of the first data. If the second data is received within the predetermined time, the method of FIG. 2 proceeds to step 208 wherein the vehicle system determines whether the challenge response is valid. The received second data in the third embodiment comprises a first information about a touch position on the touch screen 304 of the remote device 106 wherein the touch input has been received and second information indicating a position of the remote device in relation to ground. If in step 208, the vehicle system 802 determines that the received touch position is within a range from a previous touch position corresponding to a previously received challenge response, that the second information indicates than the position of the remote device is different than a previous position indicated in a previously received second information, and that the remote device forms an angle with the ground within the tilt range, then the vehicle system 802 will control the vehicle 102 to move in step 210. Otherwise, the vehicle system 802 will control the vehicle to brake in step 206.

Figure 6A:
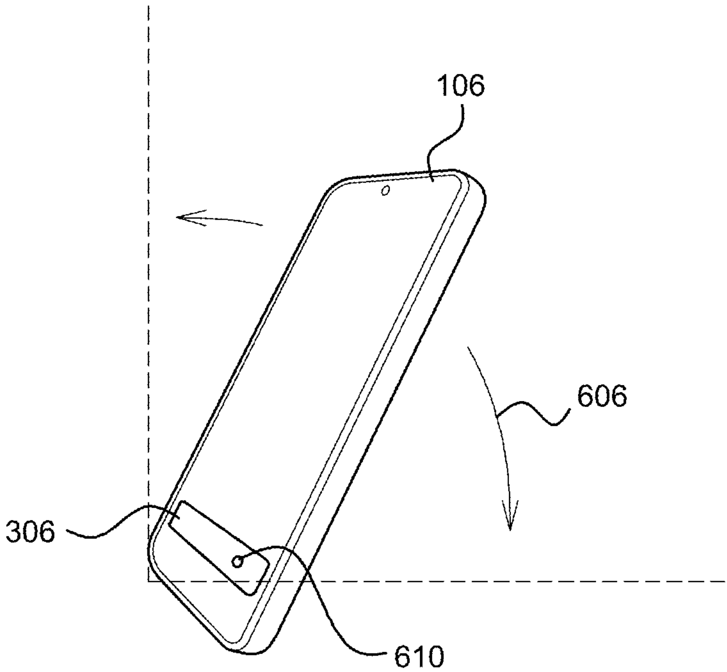
FIG. 6A schematically illustrates a remote device in a third embodiment according to the present disclosure.

FIG. 6A shows the remote device 106 is in a position forming an angle with the ground that is between zero and 90 degrees. In FIG. 6A, 604 represents a horizontal axis that is parallel to the ground while 602 represents a vertical axis that is perpendicular to the ground. The user must keep the finger within the valid area 306 (for instance, on the spot 610 of the valid area 306 but it might be in any other part of the valid area) at the same time that keeps the remote device in an angle with the ground within a tilt range. During operation the user keeps the remote device within the tilt range and only presses the button, such that he or she can focus on the environment. The second information, which may be provided by a gravity sensor of the remote device will fluctuate even when the user is not actively doing a tilting movement. The fluctuations are used such that the second information sent as a challenge response to the first data is not the same as the previous one. In this way, the second information is used by the vehicle system 802 to check that each challenge response is new. The touch input is in the same area 610 and if an error appear and the vehicle does not brake when the finger is removed, the user can brake by moving the remote device outside of the predetermined tilt range.

Figure 6B:
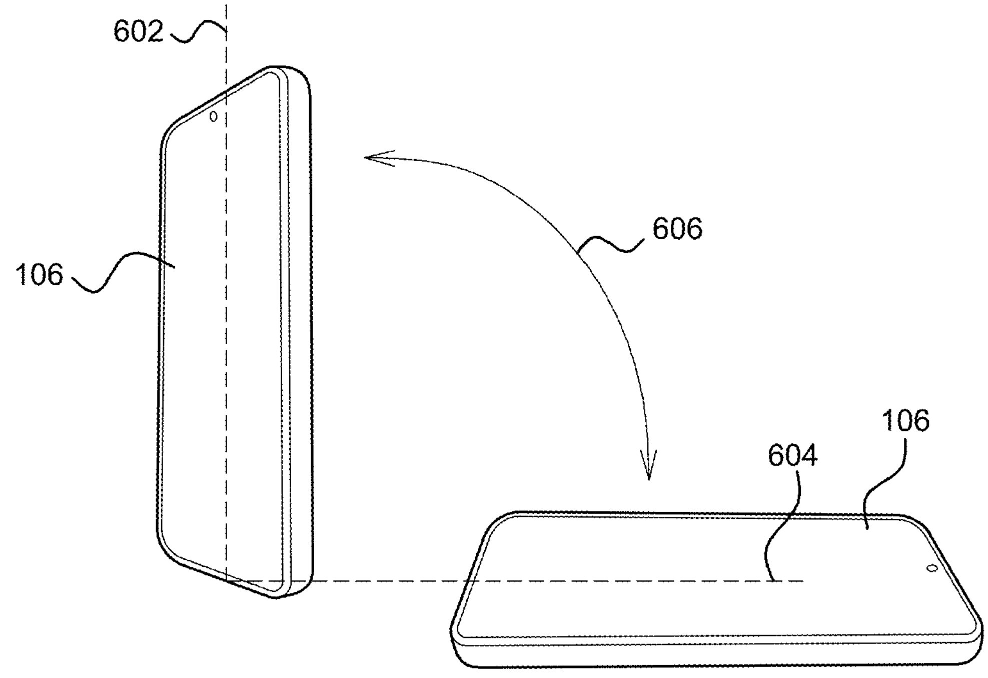
FIG. 6B schematically illustrates a verification step of a remote device according to the third embodiment.

FIG. 6B schematically illustrates a verification step of the gravity sensor performed by the remote device 106. The remote device may perform the verification step to validate the gravity sensor of the remote device and verify the tilt range before performing the method of FIG. 2. During the verification step, the user 104 tilts the remote device 106 continuously backward and forward following arc 606 from a first position wherein the remote device may form a first angle of 90 degrees with the ground plane and a second position wherein the remote device may form a second angle of zero degrees with the ground plane. This is a non-limiting example and other tilting ranges may be used. The verification step may utilize the gravity property of the remote device operating system that combines the accelerometer, magnetometer and gyroscope sensor in the device hardware. The gravity property is used to determine how the remote device is oriented in 3-dimensional space. In the verification step, the user is required to tilt the remote device. Instructions on how the tilt is performed may be shown on the touch screen 304.

By performing this verification step the vehicle system knows that the user intends to launch maneuver and can verify that the remote device sensors (touch and gravity) are working as intended. For the touch sensor, the vehicle system can verify that it is not malfunctioning in a way that it unintentionally registers presses. After confirmation it is highly unlikely that both touch and gravity sensors would start malfunctioning in a dangerous way during a maneuver. In this way, the two mechanisms complement each other as the second information is highly fluctuating while the valid area press value can be very static depending on usage. Information on how to properly engage the DMS and how to brake via releasing the DMS will be conveyed to the user prior to the maneuver.

Figure 7:
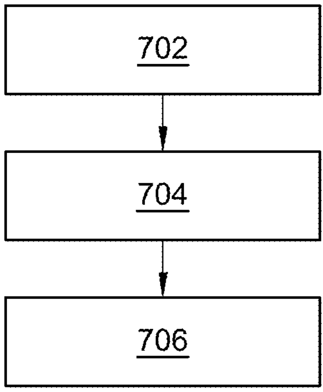
FIG. 7 illustrates a flowchart schematically depicting a process for a remote device for remotely parking or unparking a vehicle according to the present disclosure.

FIG. 7 illustrates a flowchart schematically depicting a process for a remote device for remotely parking or unparking a vehicle according to the present disclosure.

In step 702 of FIG. 7, the remote device 106 receives first data for triggering a challenge response from a vehicle system. In step 704, the remote device receives a touch input in the touch screen 304. In step 706, the remote device transmits as a challenge response second data comprising x and y coordinates of the touch input on the touch screen 304.

A further process for a remote device for remotely parking or unparking a vehicle according to the present disclosure. The process is referred to as drag and hold, and uses vehicle validation of two different sensors, a touchscreen sensor and a gravity sensor, of the remote device in order to allow the vehicle to drive. The user must fulfill all prerequisites for both of the sensors to allow the vehicle to start driving, and all prerequisites have to remain valid while the vehicle is moving. If any of the prerequisites becomes invalid during the maneuver, the vehicle will brake to standstill. The dead man's switch (DMS) is initiated via a press, drag and hold maneuver on the remote device which has to be restarted if the prerequisites are invalidated. This is to ensure that the user always has two different ways to brake the vehicle in case one of the sensors become unhealthy during the maneuver.

For the gravity validation before and during the maneuver, the driver has to keep their phone tilted in a specific orientation that allows the vehicle to drive. The user shall be aware of the allowed region of tilt that allows the vehicle to drive and know how they intend to use it to brake the vehicle.

The device will normalize the gravity sensor from the gravity constant on each axis. Then, the exact values that will be used for driving can be adjusted, but an example of rules can be:

The y-position of the gravity vector must be between 0 and −0.99.

The x-position of the gravity vector must be between −1 and 1.

The z-position of the gravity vector must be between −1 and 0.

The y-, x- and z-position of the gravity vector must fluctuate between samples.

The constraint of these specific set of rules are shown in FIG. 8, showing the acceptable tilt range during usage. If any rule is broken and the phone exits the valid tilt range, the vehicle will brake and pause the maneuver.

In an embodiment, the vehicle and device need make use of a relative coordinates. To achieve this, an initial gesture can be a way to synchronize the button placement. This embodiment includes an initial movement for the user to show intent, where the device guides the user into a movement that the vehicle can validate as an intent to drive the vehicle. It is highly important that the vehicle samples the startposition, endposition, and gesture correctly. This is especially valid if the vehicle does not know how far the driver will drag. Hence it might be needed for the device to impose some slowness on the gesture. If the user does not drag the entire way, the vehicle should be able to validate that.

In broad terms, the user presses on an initial position (x, y) and then drags across the screen towards an end-position (x+a, y+b) where $$\|(x+a, y+b)-(x, y)\| = L_v \quad (1)$$

where $L_v$ is a dragged distance as expected by the vehicle. Once the user has dragged to (x+a, y+b) and stops there within some tolerance $R_v$, the vehicle is allowed to move.

An example in vehicle validation sequence could be:

1. To the first challenge, the device responds with the initial position $(x_1,y_1)$ and that the button is pressed.
2. Challenge-response mechanism continues. Each sample is validated to be $$\|(x_n, y_v)-(x_1, y_1)\| < L_v \quad (2)$$

3. Once the m:th sample fulfills $\|(x_m,y_m)-(x_1,y_1)\|=L_v \pm R_v$, where $R_v$ is some tolerance and m>n>1, the validation process changes.
4. Following sample k is validated as $L_v - R_v < \|(x_k,y_k)-(x_m,y_m)\| < L_v + R_v$. If fulfilled, the vehicle drives.
5. If the above validation is unfulfilled, the button is released or the tilt is outside the allowed range, the vehicle will brake.

This sequence is shown from a user interface perspective in FIG. 9, showing the different parts to engage the drag and hold solution. Such a configuration allows the user interface designer to be able to place the button wherever they may please with the only limitation that the drag distance needs to be fulfilled. As direction is not imposed in this solution, the final button position could be set anywhere around the rim of a circle with radius Ly with its center at $(x_1, y_1)$, as depicted in FIG. 10 (as contrasted to other embodiments where a specific $(x_m, y_m)$ is the final position and $(x_1, y_1)$ is the initial position).

In other embodiments, if such freedom is not needed, a direction could be imposed in the validation criteria. This restriction could further enhance the original validation criteria, for example:

$$(x_m, y_m)-(x_1, y_1) = (0, L_v) \text{ Upwards, vertical} \quad (3)$$

-continued $$(x_m, y_m) - (x_1, y_1) = (0, -L_v) \text{ Downwards, vertical} \tag{4}$$

$$(x_m, y_m) - (x_1, y_1) = (L_v, 0) \text{ Right, horizontal} \tag{5}$$

$$(x_m, y_m) - (x_1, y_1) = (-L_v, 0) \text{ Left, horizontal} \tag{6}$$

(7)

As devices have different screen sizes, resolutions, and points per inch, the distances and coordinate points in device coordinates needs to be transformed into a coordinate system the vehicle comprehends. Furthermore, it must work regardless of the phone operating system. The idea is therefore that the aforementioned properties $L_v$ and $R_v$ are reported to the phone in a vehicle-specific coordinate system and the phone must always transform the recorded touchscreen data into this coordinate system. Such transformations are best visualized via a generic transformation matrix. A general transformation matrix consisting of reflection, scaling, rotation and translation can be written as:

$$M_T = R_c \times S \times R_s \times T = \begin{bmatrix} c_x & 0 & 0 \\ 0 & c_y & 0 \\ 0 & 0 & 1 \end{bmatrix} \begin{bmatrix} a_x & 0 & 0 \\ 0 & a_y & 0 \\ 0 & 0 & 1 \end{bmatrix} \begin{bmatrix} \cos\theta & -\sin\theta & 0 \\ \sin\theta & \cos\theta & 0 \\ 0 & 0 & 1 \end{bmatrix} \begin{bmatrix} 1 & 0 & t_x \\ 0 & 1 & t_y \\ 0 & 0 & 1 \end{bmatrix} \tag{8}$$

Multiplying the matrices together, and using them to transform smartphone specific coordinates to vehicle coordinates can be written as:

$$\begin{bmatrix} x_v \\ y_v \\ 1 \end{bmatrix} = \begin{bmatrix} c_x a_x \cos\theta & -c_x a_x \sin\theta & c_x a_x (t_x \cos\theta - t_y \sin\theta) \\ c_y a_y \sin\theta & c_y a_y \cos\theta & c_y a_y (t_x \sin\theta + t_y \cos\theta) \\ 0 & 0 & 1 \end{bmatrix} \begin{bmatrix} x_p \\ y_p \\ 1 \end{bmatrix} \tag{9}$$

where $a_x$ and $a_y$ are scaling coefficients, $\theta$ the rotation angle, and $t_x$ and $t_y$ are translations in x and y. $c_x$ and $c_y$ carry a sign that defines if y or x shall be reflected or not.

Example 1: Horizontally Oriented Drag Area

Example 1 is depicted in FIG. 11. As it is toward a horizontally oriented drag area, there is no rotation needed and hence $\theta=0$. There is also no reflection needed as positive y- and x-axis are oriented in the expected directions. Hence $c_x=c_y=1$. FIG. 11 depicts a lower bottom of a smartphone (as indicated by the outer lines). The inner rectangle comprises the drag and hold area. In this particular user interface, the tolerance from smartphone perspective is denoted $R_p$, and the drag distance is denoted $L_p$. Subscript p indicates that the quantity in question is reported in the smartphone coordinate system. $I_p$ indicates the point where the initial press shall occur in order to commence the DMS. The transformation therefore simplifies to:

$$\begin{bmatrix} x_v \\ y_v \\ 1 \end{bmatrix} = \begin{bmatrix} a_x & 0 & a_x t_x \\ 0 & a_y & a_y t_y \\ 0 & 0 & 1 \end{bmatrix} \begin{bmatrix} x_p \\ y_p \\ 1 \end{bmatrix} \tag{10}$$

such that $$x_v = a_x(x_p + t_x) \tag{11}$$

$$y_x = a_y(y_p + t_y) \tag{12}$$

Focusing on the scale factor $a_x$. The initial touchpoint $I_p=(x_i, y_i)$ shall be dragged to the final touchpoint $F_p=(x_i+L_p, y_i)$. The vehicle shall interpret this dragged distance as $L_v$. Transforming the x-component of these points using equation (11) and subtracting them we find that:

$$L_v := x_{v,f} - x_{v,i} = a_x L_p \tag{13}$$

$$\Rightarrow a_x = \frac{L_v}{L_p} \tag{14}$$

Next, looking toward $a_y$. By design decisions, the tolerance $R_p$ as shown in FIG. 11 is defined by vehicle tolerance $R_v$, vehicle drag distance $L_v$ and $L_p$;

$$R_p = L_p \frac{R_v}{L_v} \tag{15}$$

The height of the rectangle is defined as:

$$H_p = 2R_p \tag{16}$$

Using the initial touchpoint $I_p$ but with a different final point $F_p=(x_i, y_i+R_p)$ we subtract the final and initial point and transform the y-component using (12):

$$R_v := y_v, f - y_{v,i} = a_y R_p \tag{17}$$

$$\Rightarrow \text{Use (15)}: R_v = a_y L_p \frac{R_v}{L_v} \tag{18}$$

$$\Rightarrow a_y = \frac{L_v}{L_p} \tag{19}$$

Using (19) and (14) finds that:

$$a_x = a_y = a := \frac{L_v}{L_p} \tag{20}$$

Focusing on the translations $t_x$ and $t_y$, and defining the translations such that the initial point $I_p=(xi, y_i)$ is transformed to $I_v=(0, 0)$. Using again (11) and (12):

$$0 = a(x_{i,p} + t_x) \Rightarrow t_x = -x_{i,p} \tag{21}$$

$$0 = a(y_{i,p} + t_y) \Rightarrow t_y = -y_{i,p} \tag{22}$$

From FIG. 12 we find that $I_p=(P_{x,p}+R_p, P_{y,p}+R_p)$. Inserting (15) into this we find that $$t_x = -P_{x,p} - L_p \frac{R_v}{L_v} \tag{23}$$

-continued $$t_y = -P_{y,p} - L_p \frac{R_v}{L_v} \tag{24}$$

Substituting (20), (23), (24) in the simplified transformations (11), (12), they become:

$$x_v = \frac{L_v}{L_p}\left(x_p - P_{x,p} - L_p \frac{R_v}{L_v}\right) \tag{25}$$

$$y_v = \frac{L_v}{L_p}\left(y_p - P_{y,p} - L_p \frac{R_v}{L_v}\right) \tag{26}$$

Plugging in some example numerical values, $L_p$=100, $P_{x,p}$=$P_{y,p}$=20, $R_v$=0.2, $L_v$=1, a set of transformed coordinate pairs is shown in table 1:

TABLE 1

Numerical example on how a smartphone coordinate pair transforms into vehicle coordinate pair using the transformation matrix of Example 1.

| | | | | | | |
|---|---|---|---|---|---|---|
| $x_p$, $y_p$ | (20, 20) | (40, 25) | (80, 30) | (120, 40) | (140, 50) | (160, 60) |
| $x_v$, $y_v$ | (−0.2, −0.2) | (0.0, −0.15) | (0.4, −0.1) | (0.8, 0) | (1.0, 0.1) | (1.2, 0.2) |

Example 2: Vertically Oriented Drag Area

A further example where rotation and reflection are not set trivially is depicted in FIG. 12, which shows a top of a smartphone as indicated by the outer lines. The inner rectangle comprises the drag and hold area. In this particular user interface, the tolerance from smartphone perspective is denoted $R_p$, and the drag distance is denoted $L_p$. Subscript p indicates that the quantity in question is reported in the smartphone coordinate system. $I_p$ indicates the point where the initial press shall occur in order to commence the DMS.

In this case origin (0, 0) is at top left corner of the screen. The y-axis is positive in the opposite direction than what the vehicle expects. The gesture is also performed along the y-axis. Therefore, both a reflection and a rotation are needed. In this case, $c_y$=−1 and $c_x$=1. Since the rotation is defined as clockwise, θ=π/2. Again, the width of the rectangle is defined by (16).

For the scaling, equation (20) can be used. For the translation, equation (23) can be used, while $t_y$ instead reads:

$$t_y = -L_p - P_{y,p} - L_p \frac{R_v}{L_v} \tag{27}$$

Inserting this information into equation (9) and expanding, the transformations in this example becomes:

$$x_v = \frac{L_v}{L_p}\left[x_p \cos\left(\frac{\pi}{2}\right) - y_p \sin\left(\frac{\pi}{2}\right) - \left(P_{x,p} + L_p \frac{R_v}{L_v}\right)\cos\left(\frac{\pi}{2}\right) + \left(L_p + P_{y,p} + L_p \frac{R_v}{L_v}\right)\sin\left(\frac{\pi}{2}\right)\right] \tag{28}$$

$$y_v = \frac{L_v}{L_p}\left[-x_p \sin\left(\frac{\pi}{2}\right) - y_p \cos\left(\frac{\pi}{2}\right) + \left(P_{x,p} + L_p \frac{R_v}{L_v}\right)\sin\left(\frac{\pi}{2}\right) + \left(L_p + P_{y,p} + L_p \frac{R_v}{L_v}\right)\cos\left(\frac{\pi}{2}\right)\right] \tag{29}$$

To simplify, cos(π/2)=0 and sin(π/2)=1. We then get:

$$x_v = \frac{L_v}{L_p}\left[-y_p + L_p + P_{y,p} + L_p \frac{R_v}{L_v}\right] \tag{30}$$

-continued $$y_v = \frac{L_v}{L_p}\left[-x_p + P_{x,p} + L_p \frac{R_v}{L_v}\right] \tag{31}$$

In an example, the numbers $P_{x,p}$=70, $P_{y,p}$=90, $L_p$=100, $L_v$=1, and $R_v$=0.2 can be used. The initial point for the gesture marked in the figure is $I_p$=(90, 210). A set of points and their transformed vehicle coordinates are shown in table 2:

TABLE 2

Numerical example on how a smartphone coordinate pair transforms into vehicle coordinate pair using the transformation matrix for Example 2.

| | | | | | | |
|---|---|---|---|---|---|---|
| $x_p$, $y_p$ | (70, 230) | (80, 210) | (90, 180) | (100, 150) | (105, 120) | (110, 90) |
| $x_v$, $y_v$ | (−0.2, 0.2) | (0.0, 0.1) | (0.3, 0.0) | (0.6, −0.1) | (0.9, −0.15 | (1.2, −0.2) |

From Examples 1 and 2, the coordinates can always be transformed using the transformation matrix as defined in equation (9). The transformation matrix requires that ($x_p$, $y_p$) is recorded in a cartesian coordinate system. Furthermore, it is also required that:

The scaling factors $a_x$ and $a_y$ are defined by:

$$a_x = a_y = \frac{L_v}{L_p}.$$

The width of the rectangle is defined by the equation $$H_p = 2L_p \frac{R_v}{L_v}$$

and hence the tolerance is defined by:

$$R_p = L_p \frac{R_v}{L_v} \tag{32}$$

The translations $t_x$ and $t_y$ shall always translate the initial defined touchpoint $I_p$ to origo.

The reflection coefficients $c_x$ and $c_y$ shall carry a sign such that the positive y-axis is oriented upwards and the positive x-axis is oriented rightwards in a plane.

The rotation angle θ shall always be chosen such that $L_p$ runs along the positive x-axis, and such that $x_{f,p}+x_{i,p}>0$, meaning the drag is increasing on the x-axis.

Vehicle Validation

The validation on vehicle side in these examples would be:

1. The initial position $(x_1, y_1)=(0, 0)\pm R_v$ is a valid first position.
2. Each sample during the drag is validated to be:

$$R_v < x_n < L_v - R_v, \quad -R_v < y_n < R_v \tag{40}$$

3. Once the mth sample fulfills $$L_v - R_v < x_m < L_v + R_v, \quad -R_v < y_n < R_v \tag{41}$$

the following samples k>m shall fulfill the conditions in equation (41). If fulfilled, the vehicle starts to move.

4. If any conditions in equation (41) are not fulfilled, press is released or tilt is done outside range, the vehicle will brake.

Those skilled in the art will appreciate that the methods, systems and components described herein may comprise, in whole or in part, a combination of analog and digital circuits and/or one or more appropriately programmed processors (e.g., one or more microprocessors including central processing units (CPU)) and associated memory, which may include stored operating system software, firmware and/or application software executable by the processor(s) for controlling operation thereof and/or for performing the particular algorithms represented by the various functions and/or operations described herein, including interaction between and/or cooperation with each other as well as transmitters and receivers. One or more of such processors, as well as other digital hardware, may be included in a single ASIC (Application-Specific Integrated Circuitry), or several processors and various digital hardware may be distributed among several separate components, whether individually packaged or assembled into a SoC (System-on-a-Chip).

The methods and systems are further described by the following clauses:

1. A method performed by a vehicle system (802) for assisting remote parking or unparking a vehicle, the method comprising:
   transmitting (202), to a remote device, first data for triggering a challenge response;
   receiving (204), as the challenge response from the remote device, second data, wherein the second data comprises information about a touch position on a touch screen of the remote device;
   determining (208) whether the challenge response is valid;
   if the challenge response is valid, controlling (210) the vehicle to move; and
   if the challenge response is not valid, controlling (206) the vehicle to brake;
   wherein the challenge response is valid if the touch position is different than a previous touch position corresponding to a previously received second data, and if the touch position is within a first threshold distance from the previous touch position.
2. A method for a vehicle system (802) to assist to remotely parking or unparking a vehicle, the method comprising:
   transmitting (202), to a remote device, first data for triggering a challenge response;
   receiving (204), as the challenge response from the remote device, second data wherein the second data comprises information about a touch position on a touch screen of the remote device;
   determining (208) whether the challenge response is valid;
   if the challenge response is valid, controlling (210) the vehicle to move; and
   if the challenge response is not valid, controlling (206) the vehicle to brake;
   wherein the challenge response is valid if the touch position corresponds to an expected swipe movement on the touch screen, wherein the expected swipe movement comprises pressing down on a first zone among a plurality of contiguous zones on the touch screen, continuously moving a finger into subsequent zones and continuously moving the finger back after reaching a final zone among the contiguous zones.
3. The method according to clause 2, wherein the expected swipe movement further comprises continuously moving the finger from one contiguous zone to the next within an expected amount of time that is less than a first time threshold and more than a second time threshold.
4. The method of clause 2, wherein the expected swipe movement further comprises skipping one or two zones.
5. A method for a vehicle system to assist to remotely parking or unparking a vehicle, the method comprising:
   transmitting (202), to a remote device, first data for triggering a challenge response;
   receiving (204), as the challenge response from the remote device, second data, wherein the second data comprises a first information about a touch position on a touch screen of the remote device and a second information indicating a position of the remote device in relation to ground;
   determining (208) whether the challenge response is valid;
   if the challenge response is valid, controlling (210) the vehicle to move; and
   if the challenge response is not valid, controlling (206) the vehicle to brake;
   wherein the challenge response is valid if the second information indicates that the remote device forms an angle with the ground within a tilt range and one of the following is true:
   if the touch position is a touch movement from an initial position to an end position that is equal to or less than a set drag distance; or
   if the touch position is within a certain range from a previous touch position corresponding to a previously received second data, and if the second information indicates that the position of the remote device is different than a previous position indicated by previously received second information.
6. The method according to clause 5, wherein the tilt range is between zero degrees and 90 degrees.
7. The method according to any of the previous clauses, wherein the second data comprises horizontal and vertical coordinates of the touch position or initial position on the touch screen.

8. The method according to clause 7, wherein the vertical and horizontal coordinates comprise respectively a percentage of a width and height of the touch screen.

9. The method according to any of the previous clauses, further comprising controlling the vehicle to brake if the remote device is not located within a certain distance from the vehicle.

10. The method according to any of the previous clauses, further comprising controlling the vehicle to brake if the second data is not received within a certain time from the transmission of the first data.

11. The method according to any of the previous clauses, wherein the challenge response is valid if the touch position or touch movement is performed on a predetermined area of the touch screen.

12. A vehicle system (802) comprising a memory (808), a processing unit (804) and a communication unit (806) wherein the processing unit is configured to perform any of the method steps of any of the previous clauses.

13. A method for a remote device (106) comprising:

receiving (702) first data from a vehicle system;

receiving (704) a touch input in a position of a touch screen of the remote device; and sending (706) to the vehicle system second data in response to the first data; wherein the second data comprises information about the position of the touch input.

14. A method for a remote device (106) comprising:

receiving (702) first data from a vehicle system;

receiving (704), from a user of the remote device, a touch input on one or more positions of a touch screen of the remote device while keeping the remote device in a position such that the remote device forms an angle with the ground within a tilt range; and sending (706), by the remote device to the vehicle system, second data in response to the first data, the second data comprising a first information about the touch input, and a second information indicating the angle formed by the remote device with the ground.

15. The method of clause 14, wherein the touch input comprises an initial touch movement across the screen from an initial position to an end position, wherein a distance between the initial position and the end position is a drag distance.

16. A method for a remote device (106) comprising:

receiving (702) first data from a vehicle system;

receiving (704) a touch input performed by a user of the remote device in the form of a swipe movement on the touch screen, wherein the swipe movement comprises the user pressing down on a first zone among a plurality of contiguous zones on the touch screen with a finger, continuously moving the finger through the plurality of contiguous zones until a final zone among the plurality of contiguous zones and moving the finger back after reaching the final zone; and sending (706) to the vehicle system second data in response to the first data; wherein the second data comprises information about a touch position on a touch screen of the remote device wherein the touch input has been received.

A remote device (106) configured to perform the method of any of clauses 13-17.

Furthermore, the systems, methods and components described, and/or any other arrangement, unit, system, device or module described herein may for instance be implemented in one or several arbitrary nodes comprised in the host vehicle and/or one or more separate devices. In that regard, such a node may comprise an electronic control unit (ECU) or any suitable electronic device, which may be a main or central node. It should also be noted that the these may further comprise or be arranged or configured to cooperate with any type of storage device or storage arrangement known in the art, which may for example be used for storing input or output data associated with the functions and/or operations described herein. The systems, components and methods described herein may further comprise any computer hardware and software and/or electrical hardware known in the art configured to enable communication there between.

While the present disclosure has been described with reference to exemplary embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiments disclosed, but that the present disclosure will include all embodiments falling within the scope of the appended claims.

The invention claimed is:

1. A method performed by a vehicle system for assisting remote parking or unparking a vehicle, the method comprising:

transmitting, to a remote device, first data for triggering a challenge response;

receiving, as the challenge response from the remote device, second data, wherein the second data comprises information about a touch position on a touch screen of the remote device;

determining whether the challenge response is valid;

if the challenge response is valid, controlling the vehicle to move; and if the challenge response is not valid, controlling the vehicle to brake;

wherein the challenge response is valid if:

the touch position is different than a previous touch position corresponding to a previously received second data, and if the touch position is within a first threshold distance from the previous touch position; or the touch position corresponds to an expected swipe movement on the touch screen, wherein the expected swipe movement comprises pressing down on a first zone among a plurality of contiguous zones on the touch screen, continuously moving a finger into subsequent zones and continuously moving the finger back after reaching a final zone among the contiguous zones.

2. The method according to claim 1, wherein the expected swipe movement further comprises continuously moving the finger from one contiguous zone to the next within an expected amount of time that is less than a first time threshold and more than a second time threshold.

3. The method of claim 1, wherein the expected swipe movement further comprises skipping one or two zones.

4. A method for a vehicle system to assist to remotely parking or unparking a vehicle, the method comprising:

transmitting, to a remote device, first data for triggering a challenge response;

receiving, as the challenge response from the remote device, second data, wherein the second data comprises a first information about a touch position on a touch screen of the remote device and a second information indicating a position of the remote device in relation to ground;

determining whether the challenge response is valid;

if the challenge response is valid, controlling the vehicle to move; and if the challenge response is not valid, controlling the vehicle to brake;

wherein the challenge response is valid if the second information indicates that the remote device forms an angle with the ground within a tilt range and one of the following is true:

if the touch position is a touch movement from an initial position to an end position that is equal to or less than a set drag distance; or if the touch position is within a certain range from a previous touch position corresponding to a previously received second data, and if the second information indicates that the position of the remote device is different than a previous position indicated by previously received second information.

5. The method according to claim 4, wherein the tilt range is between zero degrees and 90 degrees.

6. The method according to claim 4, wherein the second data comprises horizontal and vertical coordinates of the touch position or initial position on the touch screen.

7. The method according to claim 6, wherein the vertical and horizontal coordinates comprise respectively a percentage of a width and height of the touch screen.

8. The method according to claim 4, further comprising controlling the vehicle to brake if the remote device is not located within a certain distance from the vehicle.

9. The method according to claim 4, further comprising controlling the vehicle to brake if the second data is not received within a certain time from the transmission of the first data.

10. The method according to claim 4, wherein the challenge response is valid if the touch position or touch movement is performed on a predetermined area of the touch screen.

11. A method for a remote device comprising:

receiving first data from a vehicle system;

receiving, from a user of the remote device, a touch input on one or more positions of a touch screen of the remote device while keeping the remote device in a position such that the remote device forms an angle with the ground within a tilt range; and sending, by the remote device to the vehicle system, second data in response to the first data, the second data comprising a first information about the touch input, and a second information indicating the angle formed by the remote device with the ground.

12. The method of claim 11, wherein the touch input comprises an initial touch movement across the screen from an initial position to an end position, wherein a distance between the initial position and the end position is a drag distance.

* * * * *